(12) United States Patent
Yoon et al.

(10) Patent No.: US 9,976,648 B2
(45) Date of Patent: May 22, 2018

(54) METHOD FOR CONTROLLING AUTOMOTIVE TRANSMISSION

(71) Applicant: HYUNDAI MOTOR COMPANY, Seoul (KR)

(72) Inventors: Young Min Yoon, Suwon-Si (KR); Seong Hwan Cheong, Hwaseong-si (KR); Hyung Wook Cho, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 114 days.

(21) Appl. No.: 15/139,689

(22) Filed: Apr. 27, 2016

(65) Prior Publication Data

US 2017/0152940 A1 Jun. 1, 2017

(30) Foreign Application Priority Data

Nov. 30, 2015 (KR) .......................... 10-2015-0168462

(51) Int. Cl.
*F16H 61/20* (2006.01)
*F16H 63/40* (2006.01)
*F16H 59/10* (2006.01)

(52) U.S. Cl.
CPC ............. *F16H 61/20* (2013.01); *F16H 59/10* (2013.01); *F16H 63/40* (2013.01)

(58) Field of Classification Search
CPC ................................. F16H 59/10; F16H 61/20
See application file for complete search history.

(56) References Cited

U.S. PATENT DOCUMENTS 3,184,913 A * 5/1965 Anderson ............... F16H 47/02
475/75
5,788,596 A * 8/1998 Robinson ................. F16H 3/66
475/118

FOREIGN PATENT DOCUMENTS

| JP | 2015-025542 A | 2/2015 |
| KR | 10-1999-009314 A | 2/1999 |
| KR | 10-1999-0062077 A | 7/1999 |
| KR | 2002-0038364 A | 5/2002 |
| KR | 10-2005-0053181 A | 6/2005 |

OTHER PUBLICATIONS

Korean Office Action issued in Application No. 10-2015-01684462 dated Jan. 18, 2017.

* cited by examiner

*Primary Examiner* — Sherry L Estremsky
(74) *Attorney, Agent, or Firm* — McDermott Will & Emery LLP

(57) ABSTRACT

An automotive transmission has a hill-hold (H) mode for preventing a vehicle parked on a slope from rolling downward, a reverse (R) mode, a neutral (N) mode, and a drive (D) mode, in which a H position and a R-range are arranged next to and connected to each other in a shift gate.

14 Claims, 2 Drawing Sheets

| Engine Status | Lever Position | Gear |
|---|---|---|
| No Cranking | H | R |
| | R | N |
| | N | N |
| | D | N |
| Cranking | H | R |
| | R | R |
| | N | Previous Gear Maintained |
| | D | 1 |

| Engine Status | Lever Position | Gear |
|---|---|---|
| No Cranking | H | R |
| | R | N |
| | N | N |
| | D | N |
| Cranking | H | R |
| | R | R |
| | N | Previous Gear Maintained |
| | D | 1 |

METHOD FOR CONTROLLING AUTOMOTIVE TRANSMISSION

CROSS REFERENCE TO RELATED APPLICATION

The present application claims the benefit of priority to Korean Patent Application No. 10-2015-0168462, filed on Nov. 30, 2015, the entire content of which is incorporated herein for all purposes by this reference.

TECHNICAL FIELD

The present disclosure relates to an automotive transmission, and more particularly, to an automotive transmission that has a hill-hold mode for preventing a vehicle parked on a slope from rolling downward, and a method for controlling the same.

BACKGROUND

An automated manual transmission (ANT) of a vehicle is a transmission that includes a clutch actuator and a gear actuator on a manual transmission to automatically enrage/disengage a clutch and gears. Such an ANT however does not include a parking device for automatic parking.

Accordingly, a driver needs to manually operate handbrake in order to park a vehicle on a slope, which may not completely stop the vehicle on a steep slope.

In general, a clutch needs to be engaged when turning off an engine. Thus, when a gear is engaged right before the engine stops, components in a powertrain including the engine, wheels, etc are directly connected. Therefore, it is difficult to turn the wheels due to a load applied to the engine.

In a manual transmission, a driver has to manually stop the engine on a slope while a gear is being engaged. In the ANT, a gear remains being engaged when the engine steps at a M drive (D) position or reverse (R) position to prevent rolling-downward the slope, and the gear is engaged when the engine stops at a neutral (N) position for parallel parking, etc.

However, most drivers do not intentionally stop the engine at the D position or R position to prevent rolling-downward on the slope, but rather, operate a handbrake to park their vehicles.

Accordingly, there exists a need for easily and stably preventing a vehicle, which is parked on a slope, from rolling downward.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art. The present disclosure is intended to propose an automotive transmission that has a hill-hold mode for preventing a vehicle, which is parked on a slope, from rolling downward, and a method of controlling the automotive transmission.

According to one embodiment in the present disclosure, a method for controlling an automotive transmission, which has a hill-hold (H) mode, a reverse (R) mode, a neutral (N) mode, and a drive (D) mode, in which a H-position and an R position are arranged next to and connected to each other in a shift gate, includes performing an R-gear, by a controller, to be engaged with a shift lever at the H position.

When an engine stops with the shift lever at the H position, the R-gear may remain being engaged.

When an engine stops with the shift lever at the R position, an N position, or a D position, an N-gear may be engaged.

When an engine stops with the shift lever at the H position, an engine may not start.

When an engine stops with the shift lever at the H position, a warning of preventing a vehicle from moving due to an external force may be generated.

When the shift lever moves to an N position, a previously engaged gear may remain engaged.

When the shift lever moves from the R-range to the N-range, an R-gear may remain engaged. When the shift lever moves from a D position to the N position, one of gears available for the D position may remain engaged.

When the shift lever moves from a D position to the N position, a first gear may he engaged.

According to another embodiment in the present disclosure, an automotive transmission includes a shift gate having a hill-hold (H) position, a reverse (R) position, a M neutral (N) position, and a drive (D) position in which the H position and the R position are arranged next to and connected to each other. A controller is configured to engage an R-gear at the H position.

The shift gate may have a sequential shift pattern of H-R-N-D positions.

According to the present disclosure, since the H position is added in the shift gate and the R-gear remains engaged to implement the H mode at the H position, it is possible to improve commercial value of a vehicle by preventing the vehicle parked on a slope from rolling downward. Further, due to the function of warning a driver not to start an engine and move the vehicle at the H position, it is possible to prevent damage to the engine or the transmission due to forcible movement of the vehicle such as towing.

Further, when the shift lever moves to the H position or the N position, unnecessary operation for engaging/disengaging gears is not needed and noise due to engaging/disengaging the gears is minimized by maintaining the previously engaged gear being engaged.

BRIEF DESCRIPTION OF THE DRAWINGS

The above and other objects, features and other advantages of the present disclosure will be more clearly understood from the following detailed description when taken in conjunction with the accompanying drawings

DETAILED DESCRIPTION

Exemplary embodiments in the present disclosure will be described hereafter in detail with reference to the accompanying drawings.

Figure 1:
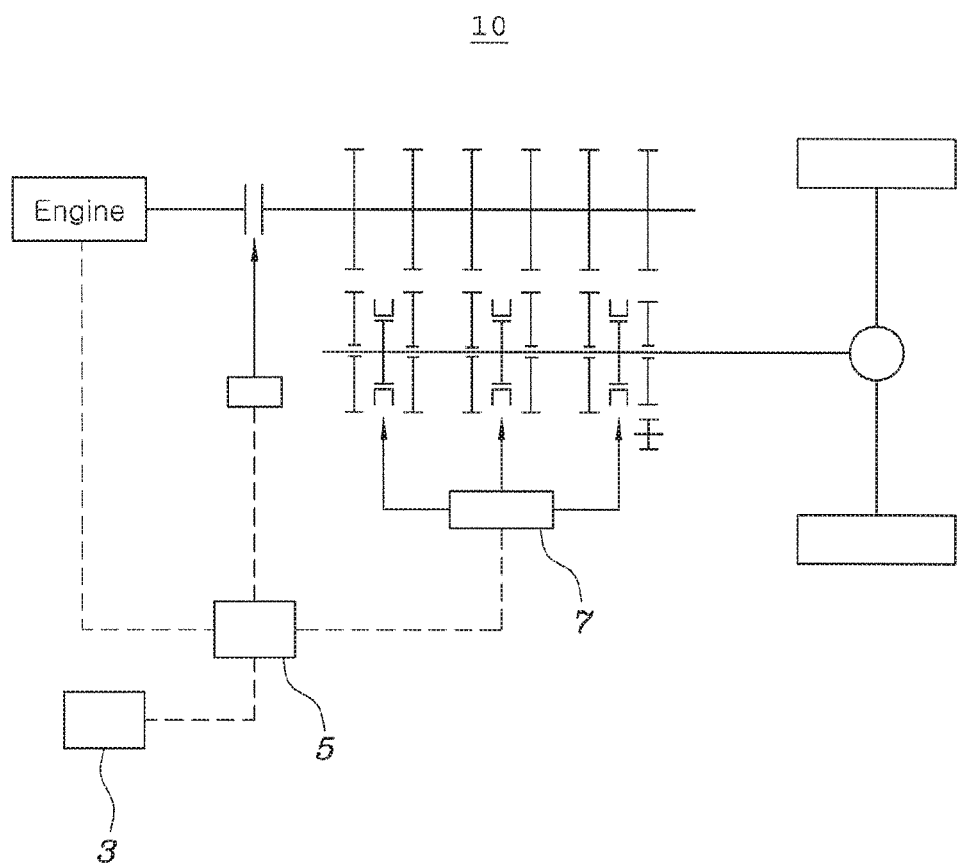
FIG. 1 is a diagram showing an exemplary configuration of an automated manual transmission (AMT) according to the present disclosure.
Figures 2, 3:
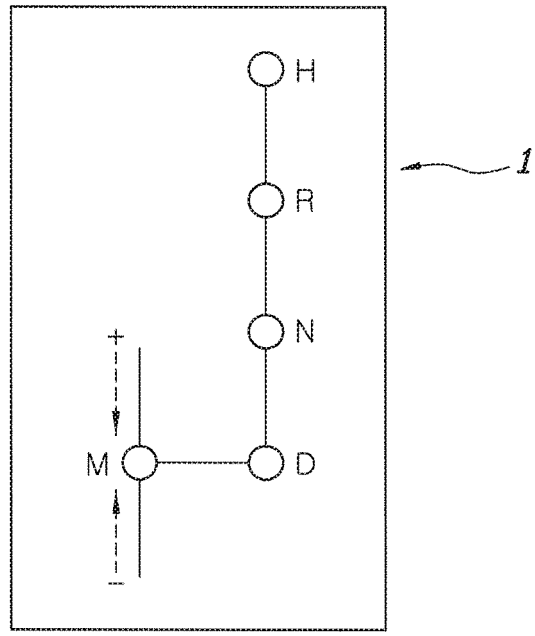
FIG. 2 is a diagram showing an exemplary shift gate of an automotive transmission according to the present disclosure.
FIG. 3 is a diagram illustrating a plan to engage gears according to the present disclosure.

Referring to FIGS. 1-3, an automotive transmission 10 of the present disclosure may include a shift gate 1 having a hill-hold (H) position (see FIG. 2). The character M as shown in FIG. 2 denotes manual mode position. Herein, the automotive transmission according to the present disclosure may be an automated manual transmission (AMT).

The shift gate 1 may have H mode in addition to a reverse (R) position, a neutral (N) position, and a drive (D) position.

The shift gate 1 may have a shift pattern such that the H position and the R position are connected. For example, the shift gate 1 may have a sequential shift pattern of H-R-N-D. The D position may further include a (+) position and a (−) position for manual shifting.

As shown in. FIGS. 1 and. 3, a controller (transmission control unit (TCU)) 5 engages an R-gear in, the H position, thus preventing a vehicle from rolling downward.

Further, when the engine stops with the shift lever 3 at the H position, the R-gear can remain being engaged.

However, when the engine stops with the shift lever 3 at the R position, N position, or D position, a N-gear can be engaged, The R-gear and forward gears can be engaged or disengaged by a gear actuator 7, which may be controlled in response to a control signal from the controller That, is, shifting can be performed by sequentially moving the shift lever 3 along the shift path of H-R-N-D. Thus, when a driver parks the vehicle on a slope and moves the shift lever 3 to the H-range, the controller 5 maintains the R-gear to be engaged, so that the vehicle does not roll downward on the slope.

When the H position is added in the shift gate 1 at the end thereof to be connected with the R position in the shift pattern, the shift range 3 has to pass the R position to move to the H position.

When the shift lever 3 moves from the R position to the H position, the R-gear remains being engaged at the R position, thus eliminating unnecessary operation for engaging disengaging the gears and minimizing noise occurring when engaging/disengaging gears.

According to the present disclosure, when the engine stops while the shift lever 3 at the H position, it is possible to prevent the engine from starting.

That is, according to the present disclosure, the vehicle can be prevented from rolling downward on a slope by preventing the engine from starting in a hill hold (H) mode which is different from a parking (P) mode. Accordingly, by informing the driver not to use the H mode when parking the vehicle on a flat road, it is possible to prevent damages on the engine when the vehicle is being towed with the engine off.

However, when the engine stops with the shift lever 3 at the H position, it is possible to war the driver not to move the vehicle using an external force according to the present disclosure.

That is, when the vehicle is being towed with the shift lever 3 at the H position and the R-gear being engaged, the engine and the transmission may be damaged. Thus, it is necessary to warn the driver not to move the vehicle in various ways, for example, using a cluster or a voice.

Referring to FIGS. 2 and 3, when the shift lever 3 moves to the N position, it is possible to maintain the gears being engaged before moving to the N position.

For example, when the shift lever 3 moves from the R position to the N position, the R-gear can remain being engaged.

When the shift lever 3 moves from the D position to the N position, it is possible to maintain one of gears, which is available for the D position, being engaged.

That is, when the R and the D position are provided next to the N position at the opposite sides in the shift pattern, the shift lever 3 should pass the R position or the D position in order to move to the N position.

Accordingly, when the shift lever 3 moves from the R position to the N position, the R-gear engaged at the R position remains being engaged. When the shift lever 3 moves from the D position to the N position, the forward gears engaged at the D position remain being engaged. Therefore, an operation for engaging/disengaging gears is not necessary and noise due to engaging/disengaging gears is reduced.

Further, when the shift lever 3 moves from the D position to the N position, for example, a first gear may be engaged.

Most drivers move the shift lever 3 from the D position to the N position before completely stopping the vehicle in order to improve fuel efficiency. However, the first gear would be engaged at the D position in accordance with the shift pattern. Thus, it is possible to maintain the first gear being engaged at the D position when moving the shift lever 3 from the D position to the N position.

As described above, according to the present disclosure, since the H position is added in the shift gate and the R-gear remains being engaged to implement the hill-hold mode at the H position, it is possible to improve commercial value of a vehicle by preventing the vehicle parked on a slope from rolling downward.

Further, due to the function of warning a driver not to start the engine and move the vehicle at the H position, it is possible to prevent damage to the engine or transmission due to forcible movement of the vehicle such as towing.

When the shift lever moves to the H position or N position, unnecessary operation for engaging/disengaging gears is not necessary and noise due to engaging/disengaging the gears can be minimized by keeping the gears being engaged.

Although exemplary embodiments in the present disclosure have been described for illustrative purposes, those skilled in the art will appreciate that various modifications, additions, and substitutions are possible, without departing from the scope and spirit of the invention as disclosed in the accompanying claims.

What is claimed is:

1. A method for controlling an automotive transmission that has an hill-hold (H) mode, a reverse (R) mode, a neutral (N) mode, and a drive (D) mode, in which a H position and an R position are arranged next to and connected to each other in a shift gate, the method comprising:
   performing an R-gear, by a controller, to be engaged with a shift lever at the H position.

2. The method of claim 1, wherein when an engine stops with the shift lever at the H position, the R-gear remains engaged.

3. The method of claim 1, wherein when an engine stops with the shift lever at the R position, an N-gear is engaged.

4. The method of claim 1, wherein when an engine stops with the shift lever at the H position, the engine does not start.

5. The method of claim 1, wherein when an engine stops with the shift lever at the H position, a warning of preventing a vehicle from moving due to an external force is generated.

6. The method of claim 1, wherein when the shift lever moves to an N position, a previously engaged gear remains engaged.

7. The method of claim 6, wherein when the shift lever moves from the R position to the N position, the R-gear remains engaged, and when the shift lever moves from a D position to the N position, one of gears available for the D position remains engaged.

8. The method of claim 6, wherein when the shift lever moves from a D position to the N position, a first gear is engaged.

9. The method of claim 1, wherein when an engine stops with the shift lever at an N position, an N-gear is engaged.

10. The method of claim 1, wherein when an engine stops with the shift lever at a D position, an N-gear is engaged.

11. The method of claim 1, wherein the R-gear is engaged or disengaged by a gear actuator which is controlled in response to a control signal from the controller.

12. The method of claim 1, wherein the automotive transmission is an automated manual transmission (AMT).

13. An automotive transmission comprising:
  a shift gate having a hill-hold (H) position, a reverse (R) position, a neutral (N) position, and a drive (D) position, in which the H position and the R position are arranged next to and connected to each other; and
  a controller configured to engage an R-gear at the H position.

14. The automotive transmission of claim 13, wherein the shift gate has a sequential shift pattern of H-R-N-D positions.

* * * * *